(12) United States Patent
Kobayashi et al.

(10) Patent No.: US 8,300,312 B2
(45) Date of Patent: Oct. 30, 2012

(54) OPTICAL ELEMENT

(75) Inventors: Shuho Kobayashi, Obaya (JP); Akiko Takeshita, Kami-ing-gun (JP)

(73) Assignee: Seiko Epson Corporation, Tokyo (JP)

( * ) Notice: Subject to any disclaimer, the term of this patent is extended or adjusted under 35 U.S.C. 154(b) by 533 days.

(21) Appl. No.: 12/619,180

(22) Filed: Nov. 16, 2009

(65) Prior Publication Data
US 2010/0134885 A1    Jun. 3, 2010

(30) Foreign Application Priority Data
Dec. 1, 2008 (JP) .................................. 2008-306045

(51) Int. Cl.
*G02B 5/30* (2006.01)
(52) U.S. Cl. .............................. 359/485.04; 359/489.08
(58) Field of Classification Search ............. 359/485.01, 359/485.03, 485.04, 487.05, 489.07, 489.08, 359/489.11, 489.15–489.17
See application file for complete search history.

(56) References Cited

U.S. PATENT DOCUMENTS

| | | | | |
|---|---|---|---|---|
| 2,868,076 | A * | 1/1959 | Geffcken et al. | 359/485.03 |
| 5,283,600 | A * | 2/1994 | Imai | 353/34 |
| 5,559,633 | A * | 9/1996 | Emkey | 359/484.03 |
| 6,160,665 | A * | 12/2000 | Yuan | 359/629 |
| 6,404,550 | B1 | 6/2002 | Yajima | |
| 6,404,552 | B1 * | 6/2002 | Manabe | 359/485.06 |
| 6,870,676 | B2 * | 3/2005 | Stark | 359/485.03 |
| 7,286,290 | B2 * | 10/2007 | Hayashi | 359/489.09 |
| 2001/0033418 | A1 * | 10/2001 | Hayashi | 359/487 |
| 2004/0145807 | A1 * | 7/2004 | Stark | 359/495 |
| 2005/0122588 | A1 * | 6/2005 | Kunisada et al. | 359/585 |
| 2006/0203341 | A1 * | 9/2006 | Schuster | 359/495 |
| 2007/0247711 | A1 * | 10/2007 | Ohtani et al. | 359/485 |
| 2009/0316084 | A1 * | 12/2009 | Yajima et al. | 349/96 |

FOREIGN PATENT DOCUMENTS

| | | |
|---|---|---|
| JP | A-2000-298212 | 10/2000 |
| JP | B2-4080265 | 4/2008 |
| JP | A-2009-258404 | 11/2009 |

* cited by examiner

*Primary Examiner* — Frank Font
(74) *Attorney, Agent, or Firm* — Oliff & Berridge, PLC (57) ABSTRACT

An optical element that has a flat plate shape and includes a light entering surface and a light exiting surface substantially parallel with the light entering surface, the element includes a plurality of translucent members, a plurality of optical multilayer films, a plurality of phase plates, and a plurality of plasma polymerized films. The translucent members, the optical multilayer films, the phase plates, and the plasma polymerized films are provided along the light entering surface and the light exiting surface. The translucent members include a plurality of oblique surfaces oblique to the light entering surface and the light exiting surface. Each of the optical multilayer films is formed on some of the oblique surfaces. The optical multilayer film is either one of a polarization separating film and a reflecting film. Each of the plasma polymerized films is formed on at least one of a surface of each of the oblique surfaces, a surface of the optical multilayer film, and a surface of each of the phase plates. At least one of each of the translucent members adjacent to the optical multilayer film and the optical multilayer film, the translucent member adjacent to the phase plate and the phase plate, and the phase plate adjacent to the optical multilayer film and the optical multilayer film is molecular-bonded with the plasma polymerized film.

4 Claims, 9 Drawing Sheets

OPTICAL ELEMENT

BACKGROUND

1. Technical Field

The present invention relates to an optical element having a light entering surface and a light exiting surface substantially parallel to each other.

2. Related Art

Various optical elements have been used in optical pickups, liquid crystal projectors, and other devices. For example, a polarization separating element (a PS conversion element) is given as an example of such optical element. The polarization separating element is formed with a polarization separating film and a reflecting film alternately provided between a plurality of sheets of glass. A portion of light incident on from a light entering surface is transmitted through the polarization separating film and outputted from a light exiting surface after a phase of the light is changed by a phase plate while the light reflected by the polarization separating film is outputted from the light exiting surface after reflected by a reflecting film.

The polarization separating element commonly has the following structure: the plurality of sheets of glass includes a first glass, a second glass, and a third glass; each glass has oblique surfaces formed along a direction obliquely intersecting with the light entering surface and the light exiting surface; the polarization separating film is formed on the oblique surface of the first glass; the polarization separating film is bonded to one oblique surface of the second glass with a bonding layer interposed therebetween; the reflecting film is formed on the other oblique surface of the second glass; and the third glass is bonded to the reflecting film with the bonding layer interposed therebetween. JP-A-2000-298212 is a first example of related art while Japanese Patent No. 4,080, 265 is a second example of related art. The first example discloses the polarization separating element in which the phase plate is bonded to the light exiting surface of the glass with the bonding layer interposed therebetween. Further, the second example discloses the polarization separating element in which the phase plate made of biaxially oriented plastic film is bonded to the polarization separating film with the bonding layer interposed therebetween.

In the first example, two types of glass are prepared and bonded by considering a thickness of the bonding layer, which is several tens of micrometers, so that intervals between the polarization separating films and the reflecting films adjacent to each other are equal. In the second example, two types of glass are prepared and bonded by considering a thickness of the phase plate so that intervals between the polarization separating films and the reflecting films adjacent to each other are equal.

In the first and second examples, it is required to prepare two types of glass having different plate thicknesses between the oblique surfaces facing each other. This causes an increase in manufacturing complexity. In other words, it is required to prepare two types of glasses having different reference values (the process target values). This results in lowering manufacturing efficiency. Particularly, since a thickness of the bonding layer is several tens of micrometers, it is hard to accurately control the thickness of the bonding layer to manufacture the polarization separating element. Further, the biaxially oriented plastic film is used as the phase plate in the second example. It lowers film thickness precision of the plastic film. As a result, accuracy of the polarization separating film is also lowered.

SUMMARY

An advantage of the invention is to provide an optical component having high manufacturing efficiency by applying the same design criteria to a plurality of translucent members.

According to a first aspect of the invention, an optical element that has a flat plate shape and includes a light entering surface and a light exiting surface substantially parallel with the light entering surface, the element includes a plurality of translucent members, a plurality of optical multilayer films, a plurality of phase plates, and a plurality of plasma polymerized films. The translucent members, the optical multilayer films, the phase plates, and the plasma polymerized films are provided along the light entering surface and the light exiting surface. The translucent members include a plurality of oblique surfaces oblique to the light entering surface and the light exiting surface. Each of the optical multilayer films is formed on some of the oblique surfaces. The optical multilayer film is either one of a polarization separating film and a reflecting film. Each of the plasma polymerized films is formed on at least one of a surface of each of the oblique surfaces, a surface of the optical multilayer film, and a surface of each of the phase plates. At least one of each of the translucent members adjacent to the optical multilayer film and the optical multilayer film, the translucent member adjacent to the phase plate and the phase plate, and the phase plate adjacent to the optical multilayer film and the optical multilayer film is molecular-bonded with the plasma polymerized film. According the aspect, the plurality of the plate-shaped translucent members—first, second, and third translucent members—is prepared. The reflecting film is formed on a surface of the first translucent member. The polarization separating film is formed on one surface of the second translucent member. The other surface of the second translucent member and the reflecting film, the polarization separating film and the phase plate, and the phase plate and the third translucent member are plasma polymerized so as to form the plasma polymerized film. The block of these plate-shaped members is cut into a predetermined shape so as to obtain the optical element. According to the aspect, a thickness of the plasma polymerized film is several tens of nanometers, which is extremely thinner than a bonding layer bonded with an adhesive having a thickness of several tens of micrometers in related art. Therefore, a thickness of the phase plate can be set only by considering a tolerance of an interval between the polarization plate and the reflecting film while ignoring the thickness of the bonding layer. This allows applying the same design criteria to the plurality of translucent members, so that film thickness designing can be simplified and manufacturing efficiency of the optical element can be enhanced.

In the optical element, the plasma polymerized film may be mainly made of polyorganosiloxane. Polyorganosiloxane is relatively flexible. Therefore, polyorganosiloxane can reduce stress caused by thermal expansion generated between the members when bonding the reflecting film and the adjacent translucent member and, the phase plate and the adjacent translucent member, and the like. Therefore, separation between these members is securely prevented. Additionally, polyorganosiloxane has high chemical resistance. Thus, it is possible to provide an optical element having high chemical resistance.

In the optical element, the following equations may be satisfied:

$$R1 = R + m = (T+Q)/\sin\theta,$$

$$R2 = R - n = T/\sin\theta,$$

$Q<(m\times\text{Sin }\theta)-qx-tx$, and $ty<n\times\text{Sin }\theta$ where a reference value of an interval between the reflecting film and the polarized separating film adjacent to each other is R, a maximum tolerance of the interval is m, a minimum tolerance of the interval is n, a reference value of board thickness of the translucent member is T, a maximum tolerance of the board thickness of the translucent member is tx, a minimum tolerance of the board thickness of the translucent member is ty, a reference value of board thickness of the phase plate is Q, a maximum tolerance of the board thickness of the phase plate is qx, an oblique angle of the oblique surface is θ, intervals between the reflecting film and the adjacent polarization separating film are R1 and R2, and the hoard thickness T of the adjacent translucent members are the same value. With this structure, an optical element can be provided that is capable of achieving the above-mentioned effects more efficiently.

In the optical element, the phase plate may be made any one of quartz crystal, lithium niobate, and calcite. The phase plate is made of an inorganic crystal material, allowing the phase plate to be thinned. Therefore, a variation of the plate thickness is reduced, and an optical element having higher manufacturing efficiency can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
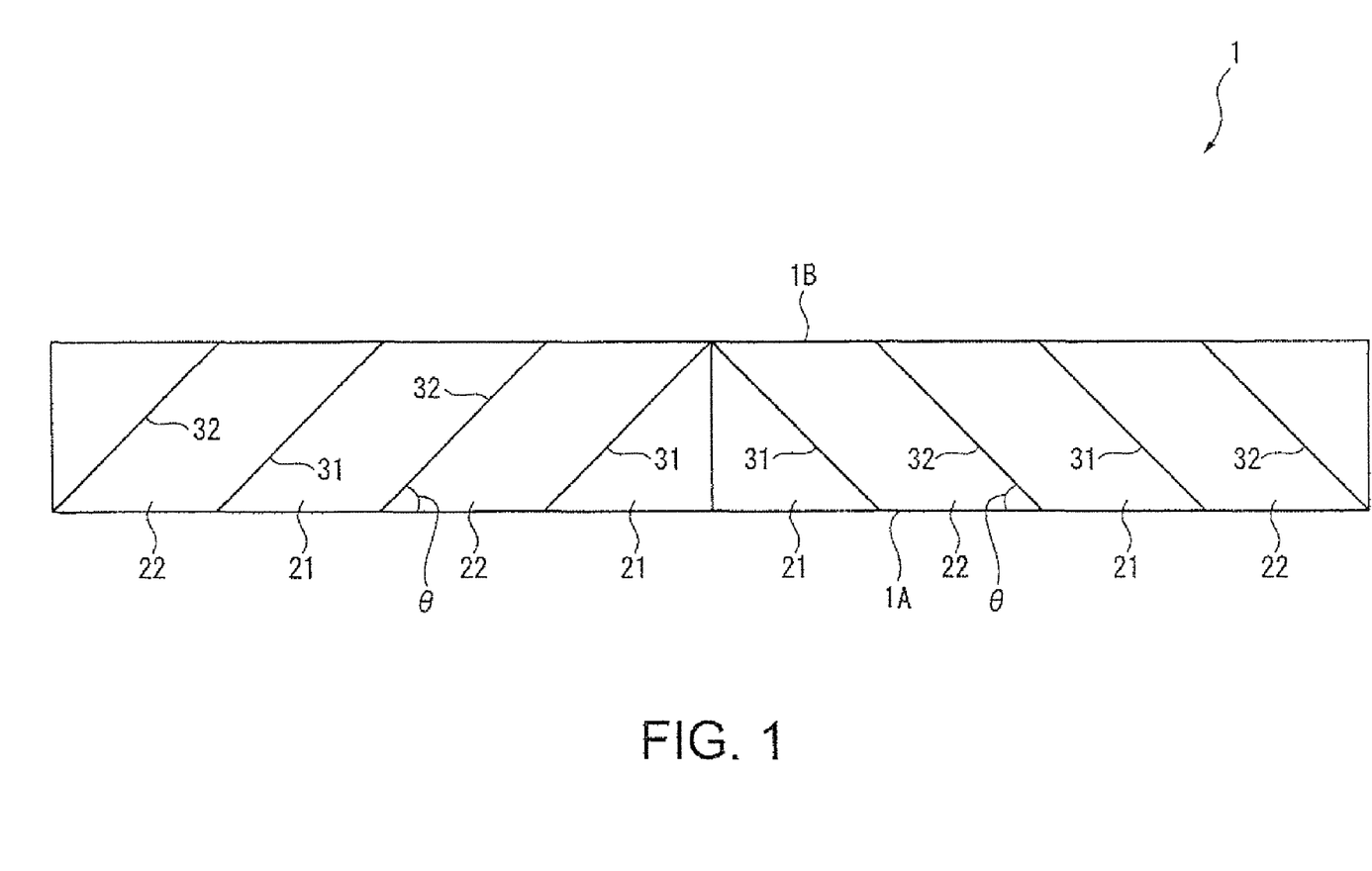
FIG. 1 is an end view schematically showing a polarization separating element serving as an optical element according to an embodiment of the invention.
Figure 2A:
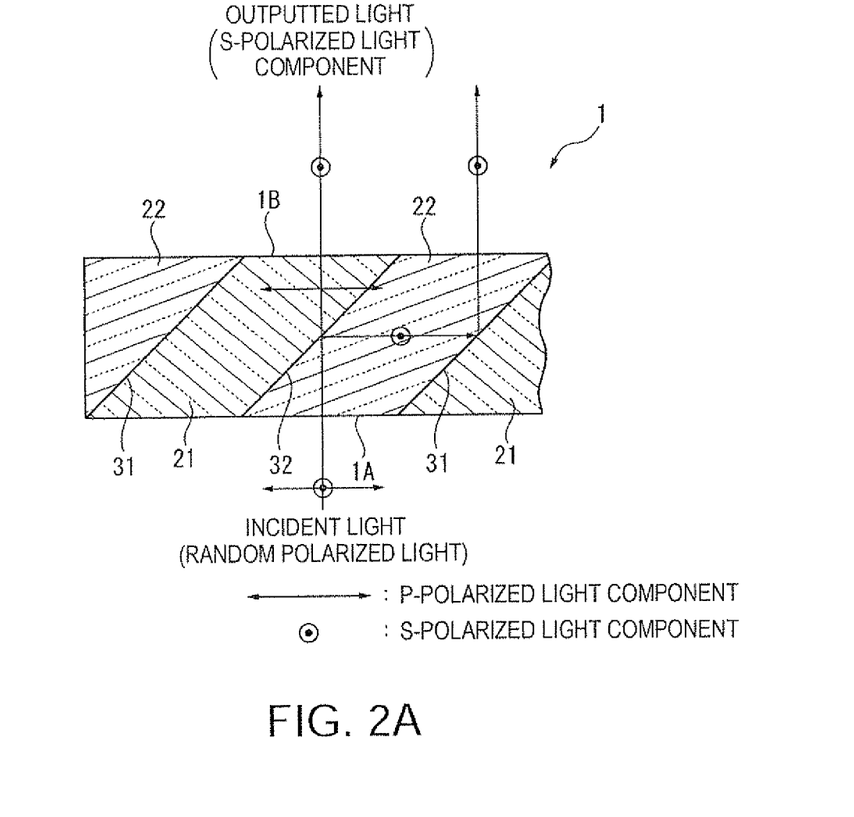
FIGS. 2A and 2B are enlarged views of a main part of FIG. 1.
Figure 2B:
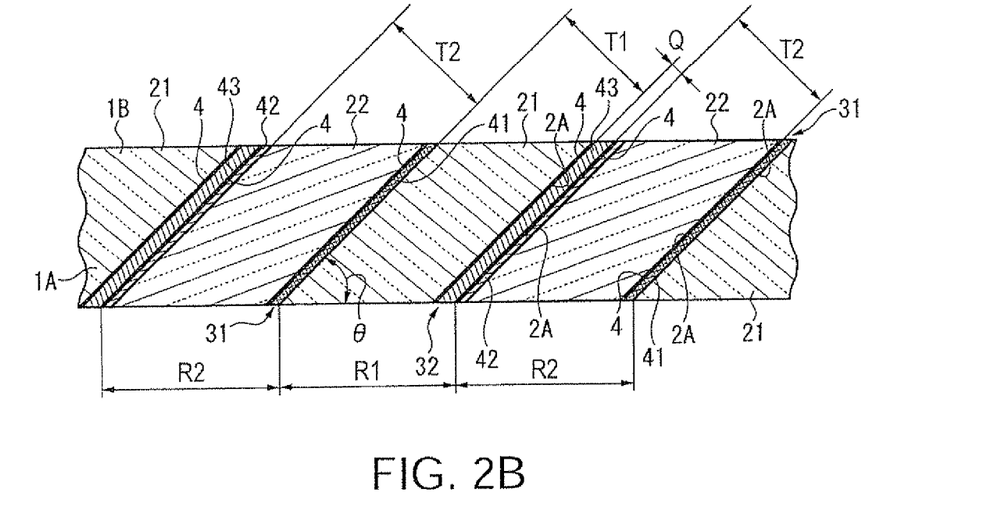

An embodiment of the invention will now be described with reference to the accompanying drawings. The present embodiment exemplifies a polarization separating element 1 serving as an optical element. The polarization separating element 1 is used for liquid crystal projectors, for example. FIG. 1 shows an end surface of the polarization separating element 1 according to the embodiment. FIGS. 2A and 2B are sectional views showing the main part of FIG. 1. Referring to FIG. 1, the polarization separating element 1 is a flat plate member in which first and second translucent members 21 and 22 are alternately provided in a manner sandwiching a first thin-film layer 31 or a second thin-film layer 32. Both sides in the provided direction of the members are referred to as a light entering surface 1A and a light exiting surface 1B.

The light entering surface 1A and the light exiting surface 1B are substantially parallel to each other. Each of the first and second translucent members 21 and 22 has an oblique surface 2A whose angle θ with respect to the light entering surface 1A and the light exiting surface 1B is 45°. The first and second translucent members 21 and 22 are made of glass including optical glass such as BK7, white sheet glass, borosilicate glass, and blue sheet glass.

A structure of the polarization separating element 1 is shown in detail in FIGS. 2A and 2B. FIG. 2A is a schematic view showing a light path for light transmitted the polarization separating element 1 while FIG. 2B is a detailed sectional view of the polarization separating element 1. Referring to FIG. 2B, the first thin-film layer 31 includes a reflecting film 41 formed on a surface of one of the oblique surfaces 2A facing each other of the first translucent member 21, and a plasma polymerized film 4 provided on a surface of the reflecting film 41. The reflecting film 41 is molecular-bonded to the second translucent member 22 with the plasma polymerized film 4. The reflecting film 41 is formed of a dielectric multilayer film or a metal film, and has a function of reflecting an S-polarized light that is incident thereon. The multilayer film forming the reflecting film 41 can be formed by vapor depositing a substance, such as silicon dioxide or titanium oxide, for example.

The second thin-film layer 32 includes a polarization separating film 42 formed on a surface of one of the oblique surfaces 2A facing each other of the second translucent member 22, the plasma polymerized film 4 provided on a surface of the polarization separating film 42, a phase plate 43 provided on a surface of the plasma polymerized film 4 on the polarization separating film 42, and the plasma polymerized film 4 provided on a surface of the phase plate 43. The polarization separating film 42 is molecular-bonded to the phase plate 43 with the plasma polymerized film 4. Likewise, the phase plate 43 is molecular-bonded to the first translucent member 21 with the plasma polymerized film 4. The polarization separating film 42 separates a bundle of rays of incident light (S-polarized light and P polarized light) into a partial bundle of rays of S-polarized light (S-polarized light) and a partial bundle of rays of P-polarized light (P-polarized light), and has functions of reflecting the S-polarized light and allowing the P-polarized light to be transmitted therethrough (refer to FIG. 2A). The polarization separating film 42 is a dielectric multilayer film in which layers made of different materials, for example, a layer of silicon dioxide ($SiO_2$), a layer of lanthanum aluminate, and a layer of magnesium fluoride ($MgF_2$), are laminated. The phase plate 43 is a half wavelength plate made of an inorganic crystal material that is any one of quartz crystal, lithium niobate, and calcite. Here, the quartz crystal may be synthetic quartz or natural quartz.

Relations of R1=R+m=(T+Q)/Sin θ=(T+Q), R2=R−n=T/Sin θ, $Q<(m\times\text{Sin }\theta)-qx-tx$, and $ty<n\times\text{Sin }\theta$ are satisfied when a reference value of an interval between the reflecting film 42 and the adjacent polarization separating film 42 is R, the maximum tolerance of the interval is m, the minimum tolerance of the interval is n, a reference value of respective plate thicknesses T1 and T2 of the first and second translucent members 21 and 22 is T, the maximum tolerance of the plate thicknesses T1 and T2 is tx, the minimum tolerance of the plate thicknesses T1 and Ts is ty, a reference value of a plate thickness of the phase plate 43 is Q, the maximum tolerance of the plate thickness of the phase plate 43 is qx, an oblique angle of the oblique surface 2A is θ (=45°), intervals between the reflecting film 41 and the polarization separating film 42 adjacent to each other are R1 and R2, and the plate thickness T1 and T2 of the adjacent translucent members 21 and 22 have the same reference value T. Since a thickness of the plasma polymerized film 4 is several tens of nanometers, the thickness can be ignored in the equations above. Also, since film thicknesses of the reflecting film 41 and the polarization separating film 42 are respectively several micrometers, these film thicknesses can be ignored. The interval between the polarization separating film 42 and the reflecting film 41 is an interval of film surface along the light entering surface. The interval R1 includes the phase plate while the interval R2 does not include the phase plate. Each of the plate thicknesses above is a thickness of a normal direction perpendicular to the oblique surface.

A method for manufacturing the optical element according to the embodiment will be described.

Thin-Film Layer Forming Step

Figure 4A:
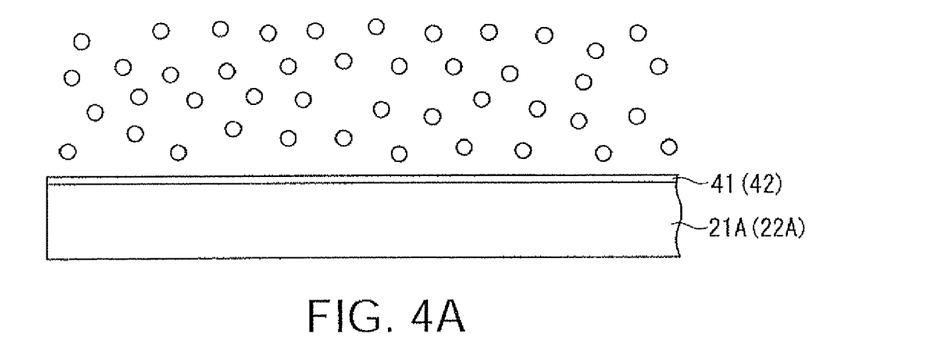
FIGS. 4A, 4B, 4C, and 4D are schematic views showing a step for forming a plasma bonding layer.

A strip-shaped optical block 21A for forming the first translucent member 21 and a strip-shaped optical block 22A for forming the second translucent member 22 are prepared (refer to FIG. 4A). The strip-shaped optical blocks 21A and 22A are made of the same material as the first and the second translucent members 21 and 22. The reflecting film 41 is formed on a surface of the strip-shaped optical block 21A by a related art method, such as vapor deposition, ion assist deposition, ion plating, or sputtering (refer to FIG. 4A). Likewise, the polarization separating film 42 is formed on a surface of the strip-shaped optical block 22A by the related art method described above.

Plasma Bonding Layer Forming Step

Figure 3:
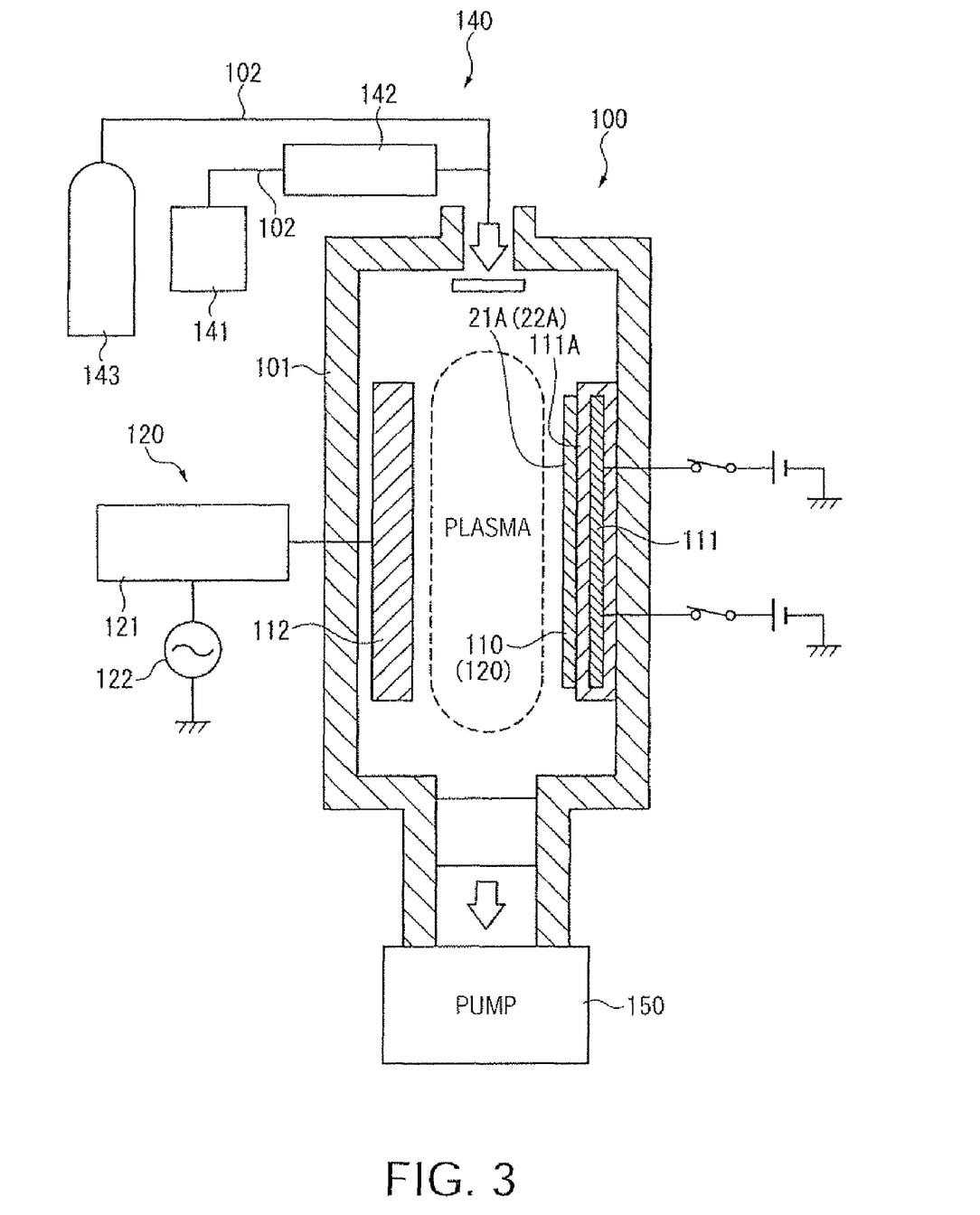
FIG. 3 is a schematic view showing a plasma polymerization device used in the embodiment.

FIG. 3 is a schematic view showing a plasma polymerization device used in the embodiment. Referring to FIG. 3, a plasma polymerization device 100 includes a chamber 101, first and second electrodes 111 and 112 provided in the chamber 101, a power supply circuit 120 applying a high frequency voltage between the electrodes 111 and 112, a gas supplying section 140 supplying a gas into the chamber 101, and an exhaust pump 150 exhausting the gas in the chamber 101. The first electrode 111 includes a support 111A supporting the strip-shaped optical blocks 21A and 22A. The first, and second electrodes 111 and 112 are oppositely disposed with the strip-shaped optical blocks 21A and 22A therebetween. The support 111A includes a triangular groove supporting oblique side portions of the strip-shaped optical blocks 21A and 22A. In a state where the strip-shaped optical blocks 21A and 22 A are supported by the triangular groove, the reflecting film 41 or the polarization separating film 42 is opposed to the second electrode 112.

The power supply circuit 120 includes a matching box 121 and a high frequency power source 122. The gas supplying section 140 includes a reservoir section 141 storing a liquid film material (a raw material liquid), a vaporizer 142 evaporating the liquid film material to change the material into a raw material gas, and a gas cylinder 143 storing a carrier gas. The carrier gas stored in the gas cylinder 143 discharges electricity due to an influence of an electric field and therefore is introduced to the chamber 101 for maintaining the electric discharge. For example, an argon gas and a helium gas correspond to the carrier gas. The reservoir section 141 and the vaporizer 142, and the gas cylinder and the chamber 101 are respectively coupled by a pipe 102 so as to supply a mixture gas of a gaseous film material and the carrier gas into the chamber 101. The film material stored in the reservoir section 141 is a raw material for forming the plasma polymerized film 4 by the plasma polymerization device 100, and is converted into the raw material gas by the vaporizer 42.

The raw gas may be a gas of: organosiloxane such as methylsiloxane, hexamethyldisilazane, octamethyltrisiloxane, decamethyltetrasiloxane, decamethylcyclopentasiloxane, octamethylcyclotetrasiloxane, or methylphenylsiloxane; an organometallic compound such as trimethylgallium, triethylgallium, trimethylaluminum, triethylaluminum, triisobutylaluminum, trimethylindium, triethylindium, or trimethylzinc; various hydrocarbon compounds, various fluorine compounds, or the like, for example. Consequently, the plasma polymerized film 4 obtained from the raw gas as above is made of a product obtained by polymerization of those materials, that is, the film 4 is made of polyorganosiloxane, organometallic polymers, hydrocarbon polymers, fluoric polymers, or the like.

Polyorganosiloxane usually exhibits hydrophobic properties. By performing various activation treatments, organic groups in polyorganosiloxane can be easily eliminated, allowing polyorganosiloxane to change from hydrophobic to hydrophilic. That is, it is possible to control the properties of polyorganosiloxane to have hydrophobicity or hydrophilicity. The plasma polymerized films 4 composed of polyorganosiloxane exhibiting hydrophobic properties are hardly bonded even if the films 4 are brought into contact with each other. That is because the organic groups in polyorganosiloxane prevent the films 4 from being bonded. On the other hand, the plasma polymerized films 4 composed of polyorganosiloxane exhibiting hydrophilic properties are easily bonded when the films 4 are brought into contact with each other. In other word, an advantage of easily controlling the property (hydrophobicity or hydrophilicity) of polyorganosiloxane results in an advantage of easily controlling adhesion properties. Thus, the plasma polymerized film 4 composed of polyorganosiloxane is favorably used in the embodiment. Additionally, polyorganosiloxane is relatively flexible. Thus, polyorganosiloxane can reduce stress caused by thermal expansion generated between the first and second translucent members 21 and 22 even if the translucent members 21 and 21 are made of different materials having different linear expansion coefficients. Furthermore, polyorganosiloxane has high chemical resistance. Thus, polyorganosiloxane can be effectively used for bonding of members exposed to chemicals or the like for a long period.

Among polyorganosiloxane, a substance mainly containing a polymerized product of octamethyltrisiloxane is preferably used. The plasma polymerized film 4 mainly made of the polymerized product of octamethyltrisiloxane has particularly high adhesion properties thus can be favorably used in the bonding method of the embodiment. The polymerized product of octamethyltrisiloxane is in a liquid state and has moderate viscosity at room temperature, being able to be easily handled.

Figure 4B:
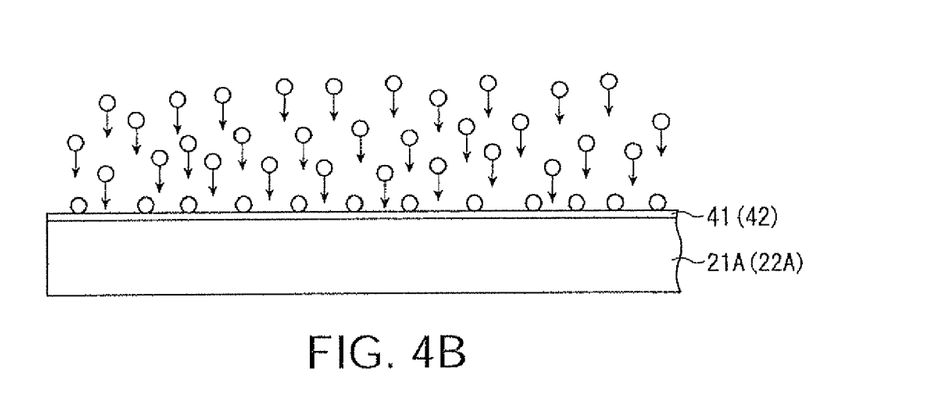
Figure 4C:
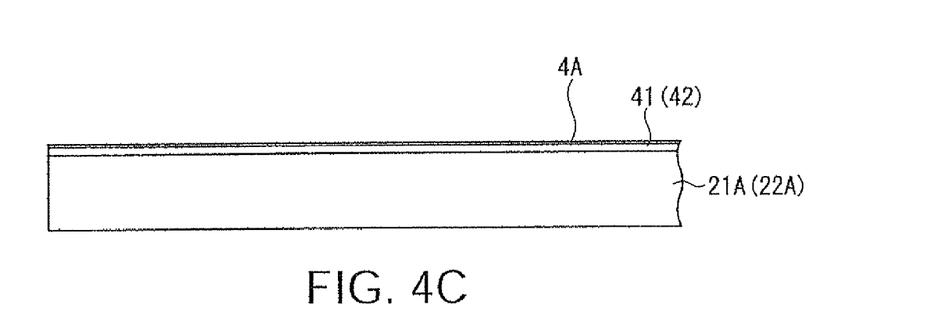

A step for forming a plasma bonding layer 4A will be described with references to FIG. 4A to 4D. In the step, the strip-shaped optical blocks 21A and 22A and the phase plate 43 are placed in the chamber 101. The optical member itself is activated by introducing a predetermined amount of oxygen into the chamber 101 while applying a high frequency voltage between the first and second electrodes 111 and 112 from the power supply circuit 120. Then, the mixture gas of the raw gas and the carrier gas are supplied into the chamber 101. The mixture gas supplied is filled in the chamber 101. As shown in FIG. 4A, the mixture gas is exposed to the reflecting film 41 provided on the strip-shaped optical block 21A and the polarization separating film 42 provided on the strip-shaped optical block 22A. By applying a high frequency voltage between the first and second electrodes 111 and 112, plasma is generated. Molecules in the raw gas are polymerized by energy of the plasma, and as shown in FIG. 4B, the polymerized substance adheres to and is deposited on the both surfaces of the reflecting film 41 on the strip-shaped optical block 21A and the polarization separating film 42 on the strip-shaped optical block 22A. Accordingly, the plasma bonding layer 4A is respectively formed on the reflecting film 41 and the polarization separating film 42 as shown in FIG. 4C. In the same manner, the plasma bonding layer 4A is formed on surfaces of the strip-shaped optical block 21A where no reflecting film 41 is provided as well as surfaces of the strip-shaped optical block 22A where no polarization separating film 42 is provided. Further, the plasma bonding layer 4A is formed on one surface of the phase plate 43.

Surface Activation Step

Figure 4D:
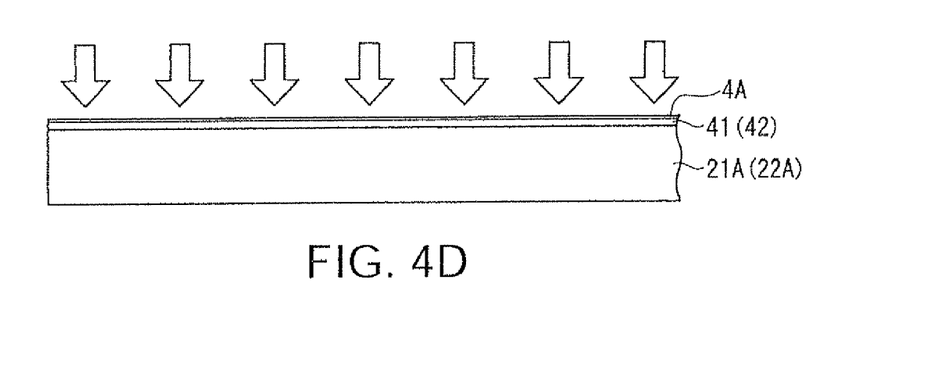

A surface of the plasma bonding layer 4A is activated as shown in FIG. 4D. The surface is activated by plasma irradiation, bringing the surface into contact with an ozone gas, a treatment with ozone water, an alkali treatment, or the like, for example. Here, activating means the following states: a state in which a molecular bond broken at the surface and inside of the plasma bonding layer 4A generates an unterminated bond; a state in which the unterminated bond is terminated by an OH group; and a state in which the above two states are mixed together. In the surface activation step, the plasma irradiation is preferably used in order to effectively activate the surface of the plasma bonding layer 4A. The reason why the surface of the plasma bonding layer 4A is irradiated is that molecular structures of the plasma bonding layer 4A are not broken more than necessary by irradiating the surface. For example, a boundary between the plasma bonding layer 4A and the reflecting film 41, and a boundary between the plasma bonding layer 4A and the polarization separating film 42 are not broken. Thus, it is possible to avoid deterioration of characteristics of the plasma bonding layer 4A.

The plasma in the present embodiment includes, for example, oxygen, argon, nitrogen, air, water, or the like, and these may be used alone or in combination of two or more. Among these, it is preferable to use a mixture of oxygen and argon. This allows preventing significant deterioration of the characteristics of the plasma bonding layer 4A as well as preventing unevenness in a wide area. Accordingly, the surface treatment can be performed in a shorter period of time. Further, the plasma can be generated by the same device used to form the plasma bonding layer 4A. Therefore, it is also possible to reduce the manufacturing cost. Time for irradiating the plasma is not specifically limited as long as the molecular bonds around the surface of the plasma bonding layer 4A can be broken. It is preferably approximately from 5 seconds to 30 minutes and more preferably from 10 seconds to 60 seconds. The OH group is introduced to the surface of the plasma bonding layer 4A activated as above. In the embodiment, a step for cleaning the first and second translucent members 21 and 22 may be provided between the plasma polymerized film forming step and the surface activation step. The cleaning step is performed by using chemicals, water, or other appropriate methods.

First Bonding Step

Figure 5A:
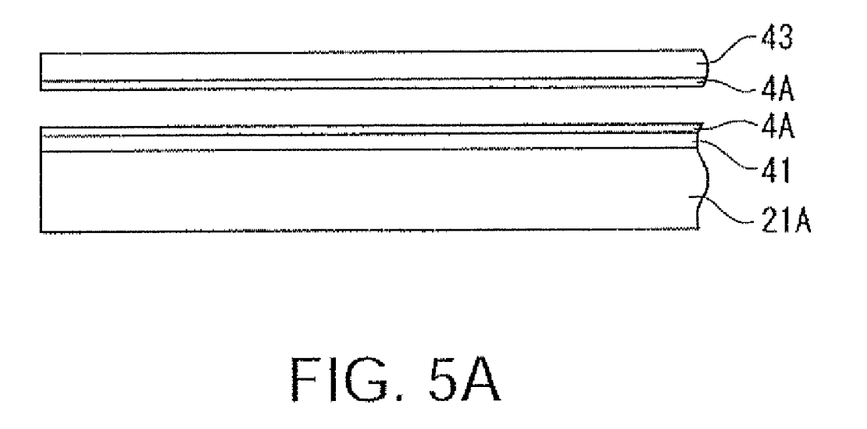
FIGS. 5A and 5B are schematic views showing a first bonding step of the embodiment.
Figure 5B:
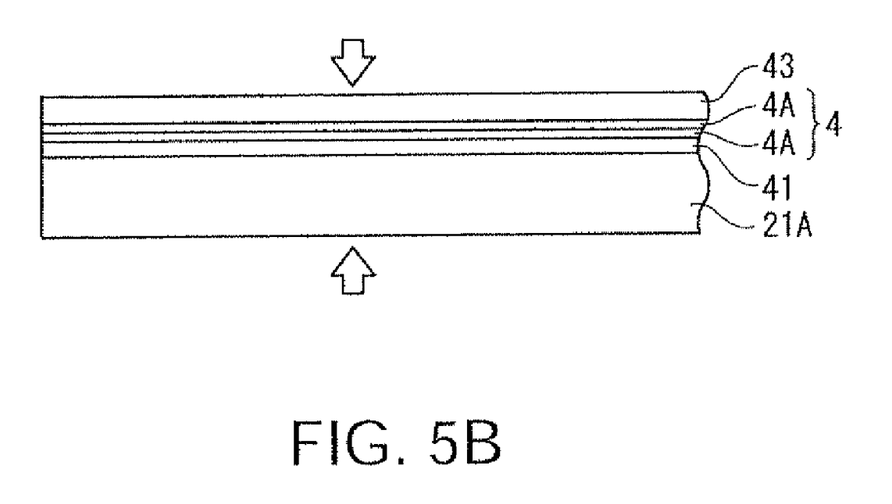

In the first bonding step, as FIG. 5A shows, the reflecting film 41 of the strip-shaped optical block 21A and the phase plate 43 are placed in a manner that the respective plasma bonding layers 4A are opposed to each other. Then, as FIG. 5B shows, the plasma bonding layers 4A are bonded together while the phase plate 43 and the strip-shaped optical block 21A are pressed against each other. The single layer of the plasma polymerized film 4 is formed by two of the plasma bonding layers 4A. The plasma bonding layers 4A are bonded by joining the layers together. It is assumed that the bond is based on a mechanism of the following [1] or [2] and [1] and [2]. [1] When two members are bonded together, the OH groups existing at the surfaces of each of the plasma bonding layers 4A are adjacent to each other. The adjacent OH groups are attracted by hydrogen bond and thus attraction force is generated between the OH groups. The OH groups attracting each other by the hydrogen bond are disconnected from the surfaces with dehydration condensation in accordance with a temperature condition. As a result, at a contact boundary between the two plasma bonding layers 4, unterminated bonds, from which the OH groups are disconnected, are bonded to each other. That is, the respective base members forming the plasma bonding layers 4A are directly bonded and integrated, forming the single layer of the plasma polymerized film 4. [2] When two members are bonded together, the unterminated bonds generated at the surface or the inside of the plasma bonding layer 4A are rebonded. The unterminated bonds are complexly bonded in a manner overlapping (intertangled) each other, thereby forming a bond of network-like at a bonded interface. Accordingly, the respective base members forming each plasma bonding layer 4A are directly bonded and integrated, forming the single layer of the plasma polymerized film 4.

Phase Plate Polishing Step

Figure 6:
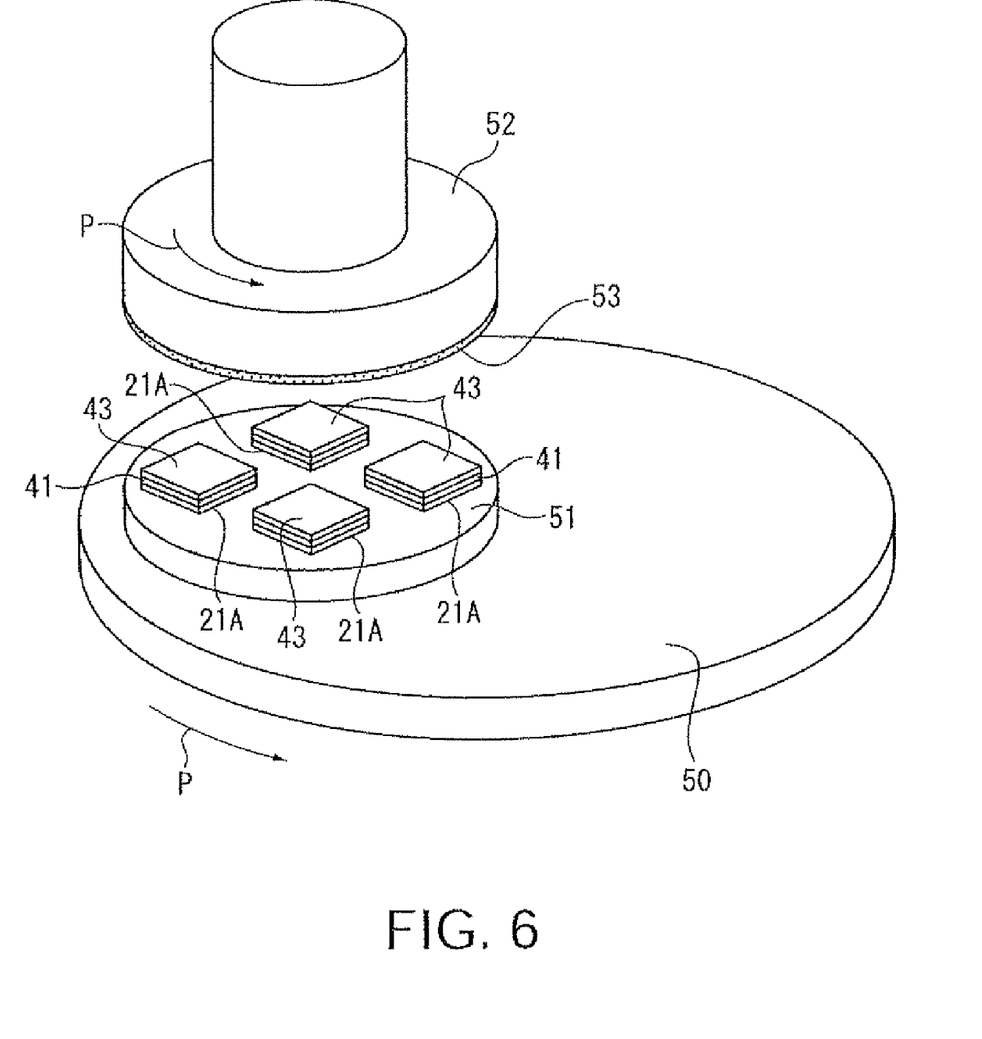
FIG. 6 is a perspective view showing a polishing apparatus used in a polishing step of the embodiment.

As FIG. 6 shows, the phase plate 43 is polished. FIG. 6 shows a polishing apparatus for the phase plate. Referring to FIG. 6, the polishing apparatus includes a rotating table 50 rotating in a P direction and a table 51 fixed on the rotating table 50. A pressure member 52 is placed opposite the table 41. The pressure member 52 can rotate in the P direction and also can move in a direction of the table 51. Disposed at an end surface facing the table 51 is a grinding stone 53. A plurality of the strip-shaped optical blocks 21A, on which the phase plate 43 is provided, is placed on the table 51. Then, in this state, the rotating table 50 and the pressure member 52 are rotated in the P direction so as to polish the phase plate 43. The phase plate 43 is bonded to the reflecting film 41 of the strip-shaped optical block 21A with the plasma polymerized film 4 interposed therebetween (not shown in FIG. 6). Therefore, the phase plate 43 is not separated from the strip-shaped optical block 21 though force from the grinding stone 53 is applied to the phase plate 43. In the embodiment, the thick phase plate 43 is prepared in advance. The phase plate 43 is polished to a predetermined thickness in a state where the phase plate 43 is bonded to the strip-shaped optical block 21A with the plasma polymerized film 4 interposed therebetween. On the polished surface of the phase plate 43, the plasma bonding layer 4A is formed by the above-described method.

Second Bonding Step

Figure 7:
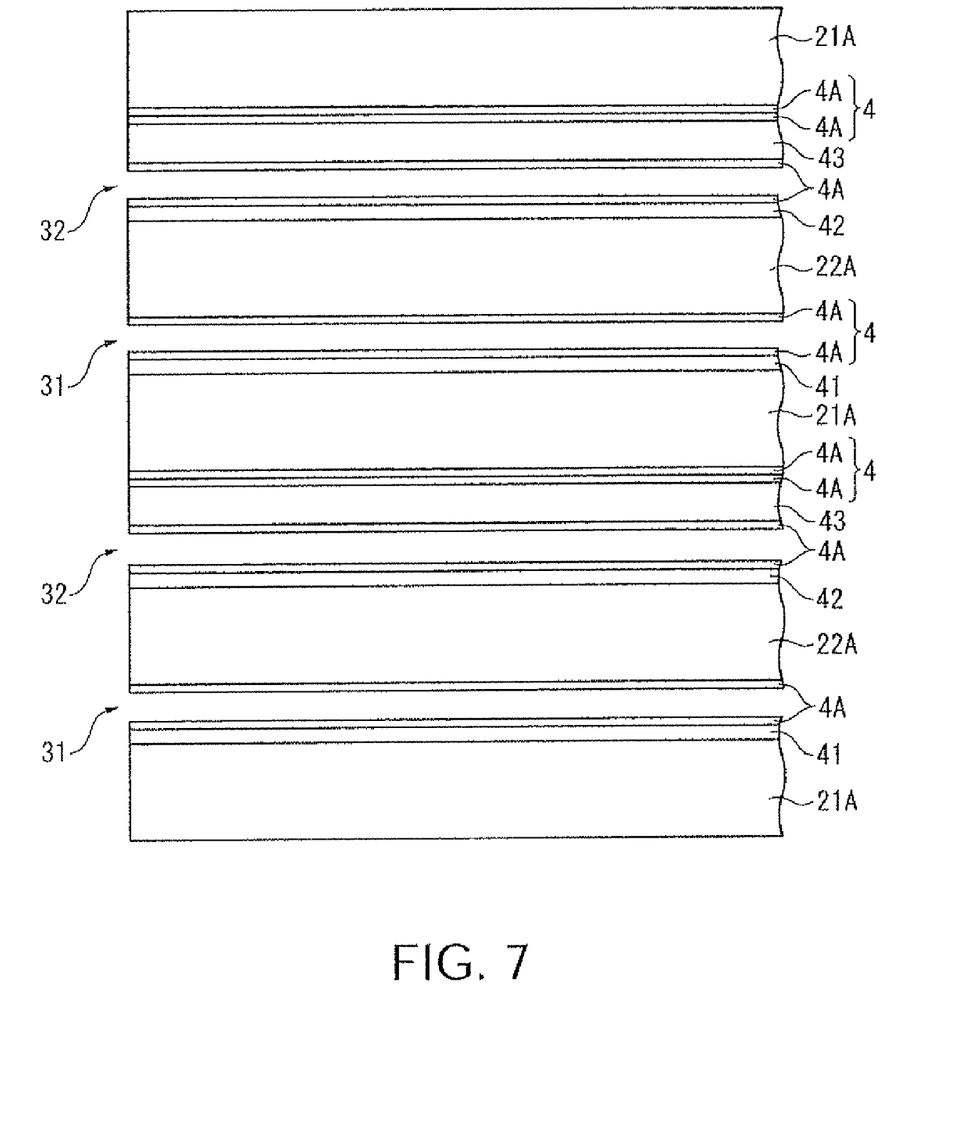
FIG. 7 is a schematic view showing a second bonding step of the embodiment.

As FIG. 7 shows, the strip-shaped optical block 21A, on which the phase plate 43 is provided, and the strip-shaped optical black 22A, on which the polarization separating film 42 is provided, are placed in a manner that the respective plasma bonding layers 4A are opposed to each other. Then the optical blocks are pressed. Accordingly, two of the plasma bonding layers 4A forms the single layer of the plasma polymerized film 4. The activated state of the surface of the plasma bonding layer 4A is temporally reduced. Therefore, the step immediately moves to the bonding step after the surface activation step. Specifically, the bonding step is preferably performed within 60 minutes after the completion of the surface activation step, and more preferably within 5 minutes. When performing the bonding step within the time frame as above, the surface of the plasma polymerized film 4 maintains a sufficiently activated state. Thus, a high bonding strength can be obtained when bonding the plasma polymerized films 4 together.

Cutting Step

Figure 8A:
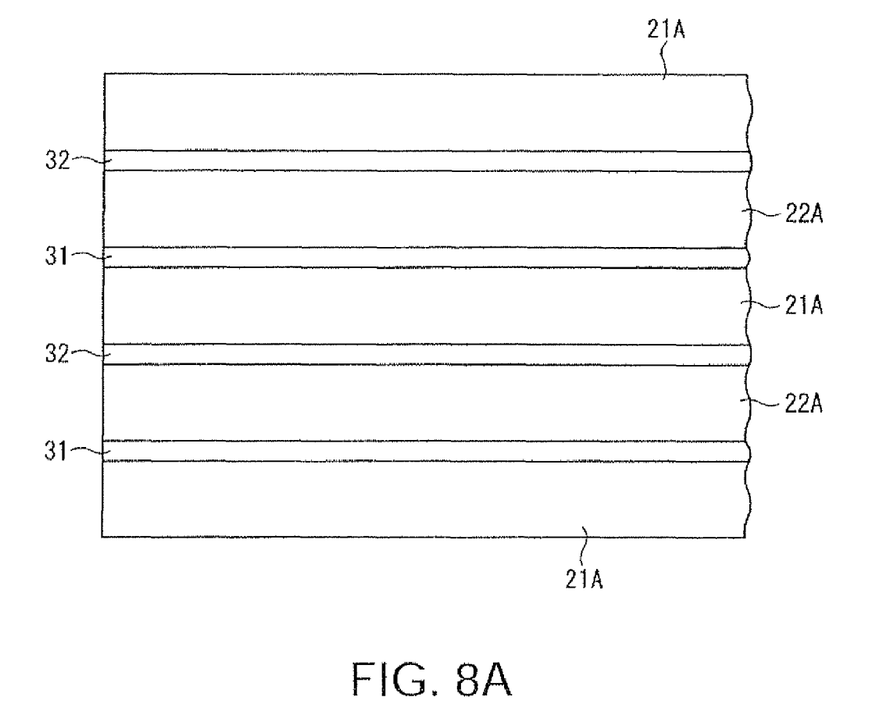
FIGS. 8A and 8B are schematic views showing a cutting step according of the embodiment.
Figure 8B:
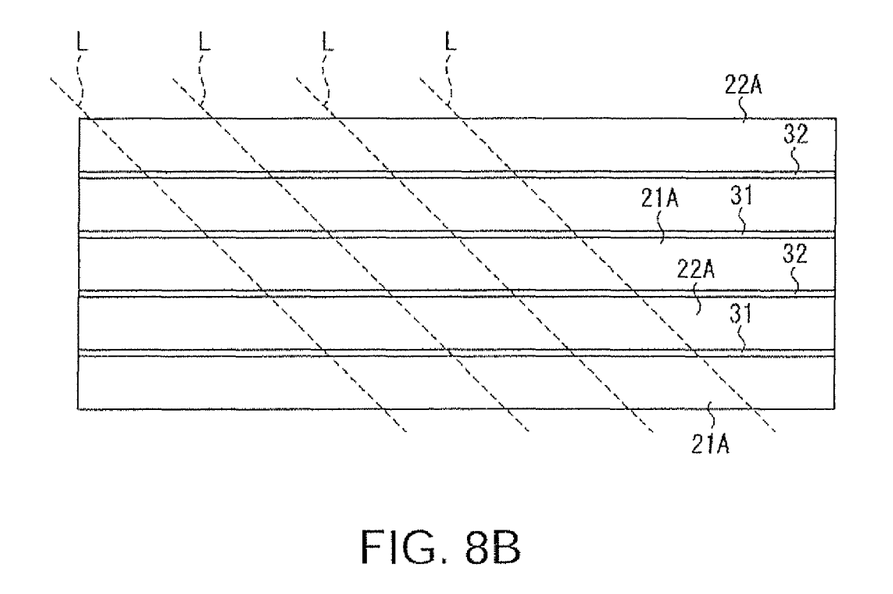
Figure 9A:
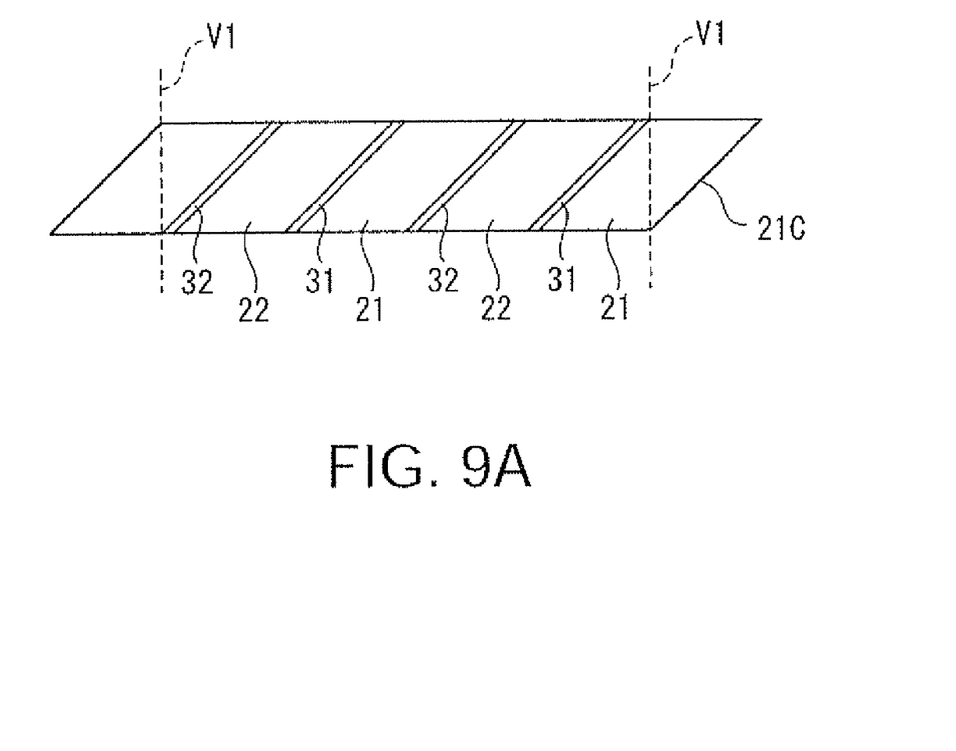
FIGS. 9A and 9B are schematic views showing the cutting step of the embodiment.
Figure 9B:
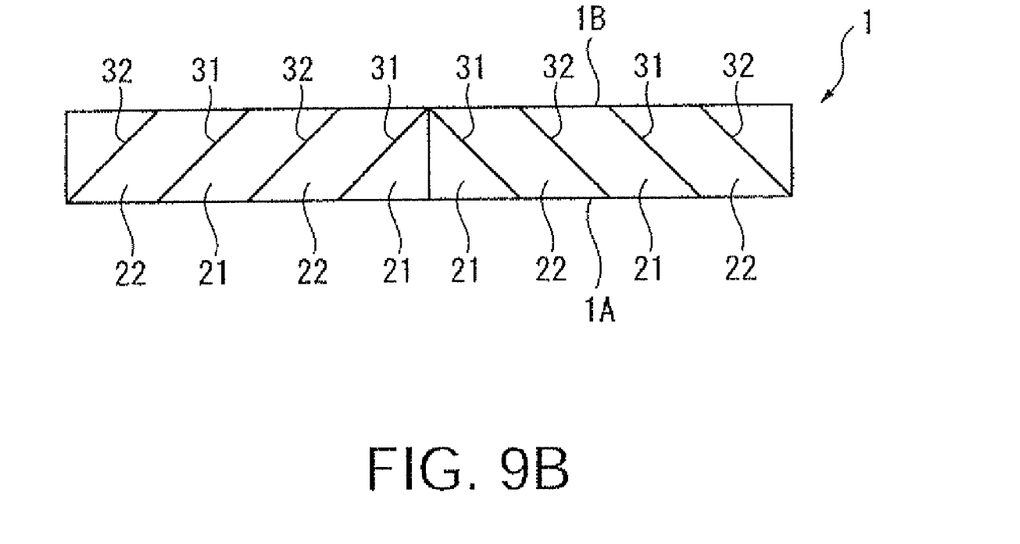

The strip-shaped optical blocks 21A and 22A, which are laminated in a plurality of numbers, are cut into a predetermined shape. As FIG. 8A shows, the strip-shaped optical blocks 21A and 22A, which are laminated in a plurality of numbers and integrated, are prepared. In this state, the reflecting film 41 and the plasma polymerized film 4 form the first thin-film layer 31 while the polarization separating film 42, the phase plate 43, and the plasma polymerized film 4 form the second thin-film layer 32. Both ends of the strip-shaped optical blocks 21A and 22A are aligned. As FIG. 8B shows, the laminated strip-shaped optical blocks 21A and 22A are cut at a predetermined interval along a direction L which forms 45° with respect to a plane of the laminated optical blocks 21A and 22A. FIG. 9 shows a block 21C, which is one of the cut blocks. An end surface of the block 21C is a parallelogram as shown in FIG. 9A. Then, the block 21C is cut along a direction V1 which is perpendicular to a plane of the block 21C at a predetermined position. As a result, the polarization separating element 1 shown in FIG. 9B is manufactured.

The embodiment has the following advantageous effects. The polarization separating element 1 has the following structure: the first and second translucent members 21 and 22, the polarization separating film 42, the reflecting film 41, the phase plate 43, and the plasma polymerized film 4 are provided along the light entering surface 1A and the light exiting surface 1B, the first and second translucent members 21 and 22 have the oblique surface 2A oblique to the light entering surface 1A and the light exiting surface 1B, the reflecting film 41 is provided on one oblique surface 2A of the first translucent member 21, the polarization separating film 42 is provided on one oblique surface 2A of the second translucent member 22, the surface of the oblique surface 2A of the second translucent member 22 is molecular-bonded to the reflecting film 41 by the plasma polymerized film 4, the oblique surface 2A of the first translucent member 21 is molecular-bonded to the phase plate 43 with the plasma polymerized film 4, and the phase plate 43 is molecular-bonded to the polarization separating film 42 with the plasma polymerized film 4. Therefore, in the embodiment, a thickness of the phase plate 43 can be set by considering the tolerance of the interval between the polarization separating film 42 and the reflecting film 41 since the plasma polymerized film 4 having several tens of nanometers is used for bonding the first translucent member 21 and the reflecting film 41, the second translucent member 22 and the reflecting film 41, and the polarization separating film 42 and the phase plate 43 comparing with an example of the related art in which the bonding layers having several tens of micrometers is used for the bond. As a result, the same design criteria can be applied to the first and second translucent members 21 and 22, so that high manufacturing efficiency of the optical element can be obtained. To be specific, if the interval between the polarization separating film 42 and the reflecting film 41 is within the tolerance, optical loss in the optical element is prevented. Thus, the optical element can be obtained that exhibits favorable conversion efficiency. This can be achieved by preparing the first and second translucent members 21 and 22 having the same design criteria. In other words, the prepared translucent members having the same design criteria may be used as the first translucent member 21 or the second translucent member 22. With these members, high manufacturing efficiency can be obtained.

The relations of $R1=R+m=(T+Q)/\sin\theta$, $R2=R-n=T/\sin\theta$, $Q<(m\times\sin\theta)-qx-tx$, and $ty<n\times\sin\theta$ are satisfied when the reference value of the interval between the reflecting film 41 and the polarization separating film 42 adjacent to each other is R, the maximum tolerance of the interval is m, the minimum tolerance of the interval is n, the respective reference values of the plate thicknesses of the first and second translucent members 21 and 22 are T, the maximum tolerance of each plate thickness of the first and second translucent members 21 and 22 is tx, the minimum tolerance of each plate thickness of the first and second translucent members 21 and 22 is ty, the reference value of the plate thickness of the phase plate 43 is Q, the maximum tolerance of the plate thickness of the phase plate 43 is qx, the oblique angle of the oblique surface 2A is $\theta$, the intervals between the reflecting films 41 and the adjacent polarization separating films 42 on the light entering surface 1A are R1 and R2, and the reference value T of the adjacent translucent members 21 and 22 are the same value. Accordingly, the effect described above can be more effectively achieved.

The plasma polymerized film 4 is mainly made of polyorganosiloxane. Polyorganosiloxane is relatively flexible. Therefore, polyorganosiloxane can reduce stress caused by thermal expansion generated between the members when the members are bonded together with the plasma polymerized film 4. Additionally, polyorganosiloxane has high chemical resistance. Thus, it is possible to provide a polarization separating element having high chemical resistance.

The phase plate 43 is made of the inorganic crystal material that is made any one of quartz crystal, lithium niobate, and calcite and thus is thinned. Accordingly, a variation of the plate thickness is reduced and the manufacturing efficiency of the polarization separating element 1 can be enhanced.

In order to obtain the phase plate 43 having a predetermined thickness, the phase plate 43 thicker than a specified value is provided on the strip-shaped optical block 21A, and the surface of the phase plate 43 is polished. As a result, it is possible to accurately perform the alignment of the phase plate 43 formed from the strip-shaped optical block 21A with respect to the oblique surface 2A of the second translucent member 22.

In the polishing step, the phase plate 43 is polished by rotating the rotating table 50 and the pressure member 53 while the strip-shaped optical block 21A is placed on the table 51. As a result, the phase plate 43 can be effectively polished into a predetermined thickness.

Example

An example of the invention will now be described for confirming the effects of the embodiment. As the example, Table 1 shows the maximum tolerance and the minimum tolerance of each category when $\theta=45°$, the reference value T of the respective plate thicknesses T1 and T2 of the first and second translucent members 21 and 22 is 2800 μm, the reference value Q of the plate thickness of the phase plate 43 is 30 μm, the reference value of the film thickness of the polarization separating film 42 is 6 μm, the reference value of the film thickness of the reflecting film 41 is 3 μm.

TABLE 1

|  | Reference Value | Maximum Tolerance | Minimum Tolerance |
|---|---|---|---|
| | | | (unit: μm) |
| Polarization Separating Film | 6 | +1 or less | −1 or less |
| Reflecting Film | 3 | +1 or less | −1 or less |
| Translucent Member (Glass) | 2800 | +20 | −20 |

TABLE 1-continued

|  | Reference Value | Maximum Tolerance | (unit: μm) Minimum Tolerance |
|---|---|---|---|
| Phase Plate (Thin Quartz Crystal Plate) | 30 | +3 | −3 |
| Interval between Polarization Separating Film and Reflecting Film | 4000 | +100 | −100 |

As a comparative example, the polarization separating elements disclosed in the first and second examples of related art are employed. Comparative example 1 is a specific example described in the paragraph [0059] of the second example of related art. Table 2 shows the designing conditions of the polarization separating element of the comparative example 1.

TABLE 2

|  | Reference Value (unit: μm) |
|---|---|
| Bonding Layer | 2 to 3 |
| Polarization Separating Film | 2 to 3 |
| Reflecting Film | 2 to 3 |
| Translucent Member (Glass) | 2160 to 2260 |
| Phase Plate (Organic Film) | 100 |

Comparative example 2 is a specific example described in the paragraph [0062] to [0065] of the first example of related art. Table 2 shows the designing conditions of the polarization separating element of the comparative example 2.

TABLE 3

|  | Reference Value (unit: μm) |
|---|---|
| Bonding Layer | 10 to 300 |
| Polarization Separating Film | several μ |
| Reflecting Film | several μ |
| Translucent Member (Glass) | 2570 to 3170 |

In the example, the thickness of the plasma polymerized film 4 is several nm as described above. The plate thicknesses of the polarization separating film 42 and the reflecting film 41 are also several nm, and thus these thicknesses can be ignored. Therefore, as Table 1 shows, the maximum tolerance of the plate thickness of the first and second translucent members 21 and 22 can be suppressed to +20 μm while the minimum tolerance of the plate thickness of the first and second translucent members 21 and 22 can be suppressed to −20 μm. In other words, in the example, the same design criteria can be applied to the first and second translucent members 21 and 22. Thus, high manufacturing efficiency of the optical element 1 can be obtained. In the comparison example 1, as Table 2 shows, the thick organic film having thickness of 100 μm is used as the phase plate. Therefore, the reference value of the plate thickness of the glass, corresponding to the translucent member of the embodiment, is 2160 μm to 2260 μm. It is apparent that the same design criteria cannot be applied to the plurality sheets of glass. As a result, it is complicated to prepare several types of translucent members based on a plurality of design criteria. In the comparison example 2, as Table 3 shows, the reference value of the plate thickness of the glass, corresponding to the translucent member of the embodiment, is 2570 μm to 3170 μm. It is apparent that the same design criteria cannot be applied to the plurality sheets of glass. Also in this case, it is complicated to prepare several types of translucent members based on a plurality of design criteria.

Based on the design of the above described example, a polarization conversion element, was prototyped and mounted on a projection display device so as to measure illuminance distribution on a projection screen. The same effect was obtained as the comparative examples. The projection display device can be obtained that ensures illuminance by reducing the thicknesses of the bonding layer and the phase plate instead of preparing the translucent members having a plurality of plate thicknesses. In addition, it is possible to prepare the translucent members by easily obtaining the minimum tolerance and the maximum tolerance of the translucent member. The tolerance can be obtained from the interval between the polarization separating film and the reflecting film and the plate thickness of the phase plate.

It should be noted that the present invention is not limited to the aforementioned embodiment but includes various modifications or improvements within a scope of this invention. For example, in the embodiment above, the first and second translucent members 21 and 22 are made of glass. The first and second translucent members 21 and 22 may be made of a material other than glass. For example, the material may be a transparent plastic material such as polycarbonate or an acrylic material. Additionally, the phase plate 43 having a predetermined size may be prepared in advance so as to omit the polishing step of the phase plate 43.

Though in the embodiment, the polarization separating element 1 is described as an optical element, the specific structure of the optical element is not limited as long as the optical element includes the first and second translucent members 21 and 22, the polarization separating film 42, the reflecting film 4, the phase plate 43, and the plasma polymerized film 4 provided along the light entering surface 1A and the light exiting surface 1B. Further, the optical element of the invention can be used for optical devices other than the liquid crystal projector. For example, the optical devices may be an optical pickup, a camera, and the like.

The entire disclosure of Japanese Patent Application No 2008-306045, filed Dec. 1, 2008 is expressly incorporated by reference herein.

What is claimed is:

1. An optical element that has a flat plate shape and includes a light entering surface and a light exiting surface substantially parallel with the light entering surface, comprising:
   a plurality of translucent members;
   a plurality of optical multilayer films;
   a plurality of phase plates; and
   a plurality of plasma polymerized films, wherein the translucent members, the optical multilayer films, the phase plates, and the plasma polymerized films are provided along the light entering surface and the light exiting surface,
wherein the translucent members include a plurality of oblique surfaces oblique to the light entering surface and the light exiting surface,
wherein each of the optical multilayer films is formed on some of the oblique surfaces,
wherein the optical multilayer film is either one of a polarization separating film and a reflecting film,
wherein each of the plasma polymerized films is formed on at least one of a surface of each of the oblique surfaces, a surface of the optical multilayer film, and a surface of each of the phase plates, and wherein at least one of each of the translucent members adjacent to the optical multilayer film and the optical multilayer film, the translucent member adjacent to the phase plate and the phase plate, and the phase plate adjacent to the optical multilayer film and the optical multilayer film is molecular-bonded with the plasma polymerized film.

2. The optical element according to claim 1, wherein the plasma polymerized film is mainly made of polyorganosiloxane.

3. The optical element according to claim 1, wherein the following equations are satisfied:

$R1=R+m=(T+Q)/\text{Sin }\theta,$ $R2=R-n=T/\text{Sin }\theta,$ $Q<(m\times\text{Sin }\theta)-qx-tx,$ and $ty<n\times\text{Sin }\theta$ wherein a reference value of an interval between the reflecting film and the polarized separating film adjacent to each other is R, a maximum tolerance of the interval is m, a minimum tolerance of the interval is n, a reference value of board thickness of the translucent member is T, a maximum tolerance of the board thickness of the translucent member is tx, a minimum tolerance of the board thickness of the translucent member is ty, a reference value of board thickness of the phase plate is Q, a maximum tolerance of the board thickness of the phase plate is qx, an oblique angle of the oblique surface is $\theta$, intervals between the reflecting film and the adjacent polarization separating film are R1 and R2, and the board thickness T of the adjacent; translucent members are the same value.

4. The optical element according to claim 1, wherein the phase plate is made any one of quartz crystal, lithium niobate, and calcite.

* * * * *